July 1, 1924.

R. LONG

CHAIN PUMP

Original Filed July 29, 1922

1,499,386

Inventor
Ramon Long
By his Attorney
Harry L. Duncan

Patented July 1, 1924.

1,499,386

UNITED STATES PATENT OFFICE.

RAMON LONG, OF NEW YORK, N. Y., ASSIGNOR TO AMERICAN LIQUOLIFT CORPORATION, A CORPORATION OF DELAWARE.

CHAIN PUMP.

Application filed July 29, 1922, Serial No. 578,503. Renewed December 18, 1923.

*To all whom it may concern:*

Be it known that I, RAMON LONG, a citizen of the United States, and now residing in the city, county, and State of New York, formerly of Englewood, county of Bergen, State of New Jersey, have made a certain new and useful Invention Relating to Chain Pumps, of which the following is a specification taken in connection with the accompanying drawing, which forms part of the same.

This invention relates especially to chain pumps in which the water carrying chain which may be vertically or otherwise arranged to pass over one or more supporting or driving wheels may be driven by the upper wheel or by a driving wheel located at any convenient intermediate point where it is more desirable to apply the power. This chain is preferably made or built up of interlocking or intermeshing links of bent up wire or strip material having connector members which intermesh with each other and cooperate with suitable connecting pivots or the like while laterally projecting water carrying portions of the links serve to greatly increase the water carrying capacity thereof, so that a high duty pump chain is thus produced. These water carrying portions may comprise integral parts of the wire link material which are arranged on one or both sides of the connector members so as to preferably form projecting end loops and a plurality of longitudinal links which may be arranged on one or both sides of the connector members in parallel position with respect thereto, if desired. A plurality of such links may be connected in intermeshing position and a sufficient number of links may be arranged side by side to give the pump chain the desired transverse width and liquid carrying capacity, and, if desired, sprocket or driving chains may be arranged on each side of the water carrying links and connected to the connecting pivots, if desired, so as to more definitely space apart the main or water carrying links and largely relieve them of tension stresses under operating conditions.

In the accompanying drawing showing in a somewhat diagrammatic way a number of illustrative embodiments of this invention:

Figure 1:
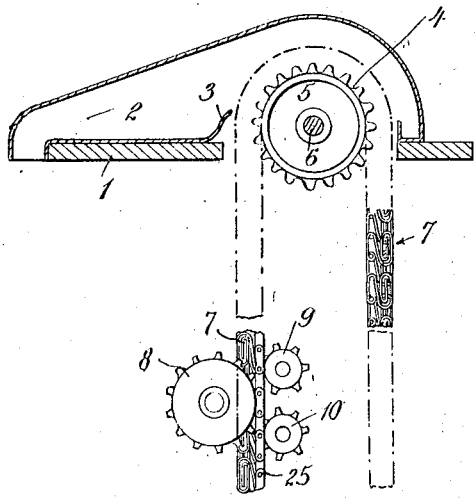
Fig. 1 is a sectional side view of a somewhat diagrammatic arrangement of a chain pump of this character.

Pump chain of this high duty or large capacity character may in many cases be advantageously formed of links which are made of bent up square, round or other sectioned wire or strip of any suitable material which properly cooperates with the water or other liquid being handled and brass, bronze, Monel metal, wrought iron or steel which may be of special non-corrosive or non-rusting character may be used, if desired, when suitably protected by various galvanizing, electroplating or other coating processes in some cases. The chain links may comprise connector members extending around the connecting pivots which may be used in building up such pump chain and each link may advantageously be formed with laterally projecting water carrying portions on one or both sides of the connector members and which may be formed from integral extensions or ends of the link and may comprise more or less parallel longitudinal members and end loop members which may in many cases extend out considerably beyond the connector members of the link so as to give greatly increased liquid carrying capacity. As is shown in Fig. 1, the continuous chain 7 of this general type may extend over an upper supporting or driving wheel 5 mounted on the shaft 6, for example, and especially where the pump chain is operated by such an upper driving wheel, sprockets 4 may be provided on the wheel to give definite interlocking action with the water carrying links or with the connected or cooperating sprocket chains, such as 25, which may be used in connection therewith. This upper supporting wheel may be mounted on a support or member 1 so as to extend within a top casing 2 of any suitable construction to receive the water or other liquid which is thrown off the chain at this point by centrifugal force as the chain goes around the upper wheel while suitable guides 3 direct the liquid toward the discharge opening or passage in the top casing. The lower end of the pump chain which is indicated in dot and dash lines of course extends several feet below the level of the liquid to be raised and may, if desired, operate over a lower wheel or idler pulley of generally similar construction which promotes the uniform action of the chain and minimizes undesirable lateral vibration of the vertical runs of the pump chain which may be twenty to fifty feet or more long and operated at any suitable surface speed up to four to six hundred feet per minute.

Figure 2:
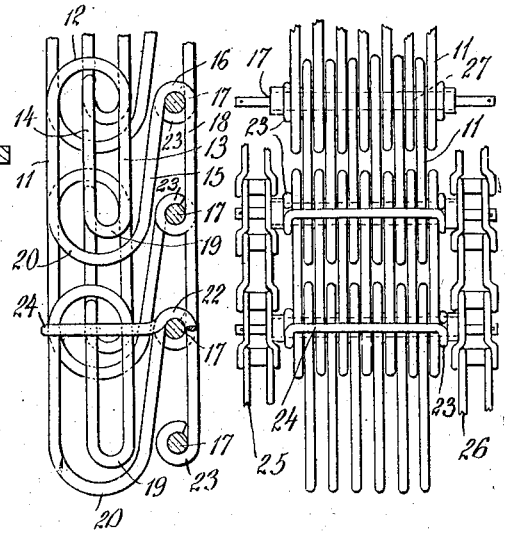
Fig. 2 shows on a larger scale the chain link construction.
Figure 3:
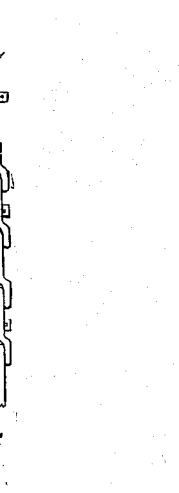
Fig. 3 is an elevation of the chain taken at right-angles to Fig. 2.

As is indicated more in detail in Figs. 2 and 3 the chain links may comprise the connector members 18 of round or preferably square sectioned wire strip or stock which may have the pivotal portions 23, 16, bent around to accommodate the connecting pivots 17 extending transversely of the chain so as to support each link in the desired position. Each chain link is preferably provided with laterally projecting water carrying portions formed by bending up one or both ends of the link material so as to form a plurality of longitudinal members such as 11, 14, 13, and 15 which may in some cases be substantially parallel to the connector member 18 as indicated in Fig. 2. These longitudinal members are spaced apart at such distances as to have the desired holding or retaining action on the water or other liquid being handled so as to give the most efficient action with the particular liquid in question which of course is held in the ascending run of the pump chain by attraction and surface tension action. For this purpose with water and generally similar liquids these longitudinal members are preferably not spaced apart more than about a quarter to three eighths of an inch and in some cases the adjacent longitudinal members may be even closer together where the service is unusual or severe. The end loop members of the link, such as 12, 20, are preferably carried out beyond the connecting pivots so that as indicated in Fig. 2 the end loops of the odd numbered meshing rows of links of the chain which are preferably aligned as is shown in Fig. 3, may approach each other quite closely so as to have additional holding and carrying engagement which contributes to a considerable extent to the efficient operation of such a chain pump.

In some cases it is desirable to definitely retain the links in the desired transverse alignment by the use of such transverse coupling members as 24 which may have the ends 22 coiled around the connecting pivots so that these fairly stiff coupling members may fit fairly closely to the water carrying links of the chain and especially adjacent the pivots so as to keep them in substantial transverse alignment under operating conditions. If desired, these main or water carrying links of the pump chain may have sprocket chains arranged in connection therewith so as to more definitely keep them in alignment and support their weight under operating conditions, and for this purpose sprocket chains, such as 25, 26, may be arranged on both sides of the main or water carrying links by connecting the sprocket chains to the connecting pivots. In this way tension strains may be considerably or largely removed from the water carrying links under operating conditions and the driving sprockets may exclusively engage these auxiliary or sprocket chain links for this purpose. In many cases it is advantageous to operate such a pump chain from an intermediate driving point instead of from the top of the endless chain, and for this purpose one or more intermediate driving wheels, such as 8, may be arranged to cooperate with any suitable part of the pump chain preferably in its descending side, as indicated in Fig. 1, or with the auxiliary sprocket chains united thereto so as to apply the driving power to the chain at any suitable intermediate point below the top. Where a single driving sprocket wheel 8 is used in connection with each sprocket chain, for example, one or more guide wheels or sprockets 9, 10 may be used in cooperation with this driving wheel so as to more definitely hold the chain in mesh or cooperative relation with respect thereto.

Figure 4:
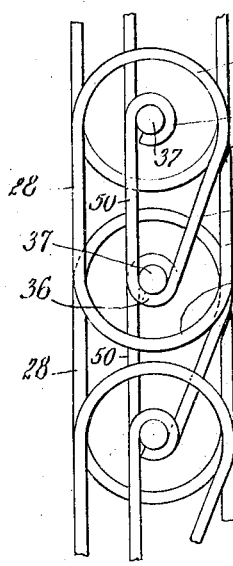
Fig. 4 is a side view of another form of chain link construction.
Figure 5:
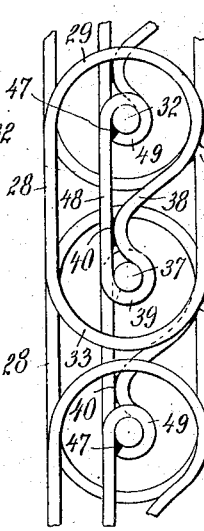
Fig. 5 is a side view showing still another form of chain link.

Fig. 4 shows another form of chain link in which the connector members 50 may have similarly arranged ends 31, 36, bent around the pivots 37 so as to support each chain link and the strip or wire stock of which each chain link is composed may advantageously be extended at one or both ends of the connector member so as to form end loops 28, 33 and laterally projecting water carrying portions in connection with the longitudinal members 28, 30 and 34 which are located in this instance on both sides of the connector member and at suitable distances therefrom to give the desired liquid holding or retaining action in connection with the particular liquid or material being handled. In some cases the ends of the link material may be welded, soldered or fastened in position, for example, by welding or soldering the end 35 of the wire stock which may be beveled to make a smooth connection with the adjacent portion of the end loop 29 which may be welded or soldered thereto at the point 32 to give greater strength and rigidity to the link. Fig. 5 shows another form of link in which the bent end 49 of the connector portion 48 may be welded or soldered thereto at the point 47 as indicated while the other bent end of this connector member may be brought inward so as to be welded or soldered at about the point 40 to this connector member, so that a more strong and rigid connector member is thus formed. One or more longitudinal members, such as 28, 34 and 38 may be formed of bent link material on one or both sides of the connector member so that together with the end loop members 29, 33 each intermeshed link has great liquid holding and carrying capacity in connection with the cooperating adjacent links. In this case also the end 35 of the outer longitudinal member may be beveled or tapered and welded or soldered at the point 41 to the adjacent end loop member so as to make the outer water carrying portions of the link of correspondingly rigid and strong character.

Figure 6:
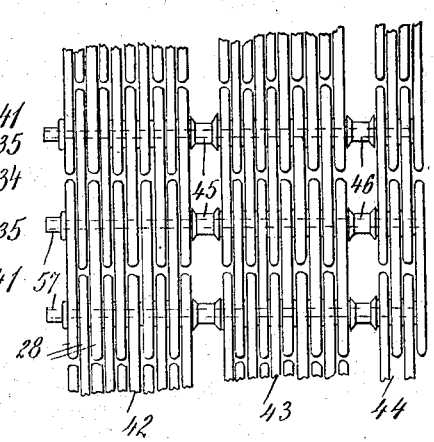
Fig. 6 is a transverse elevation showing a method of assembling and driving such links.

In case of pump chains having great transverse dimensions it is sometimes desirable as indicated in Fig. 6 to have the chain links 28 arranged on the connecting pivots 57 so as to form a series of transversely spaced chain sections 42, 43, 44, and these sections may be separated by spacing and driving rolls 45, 46, so as to definitely space the sections apart. Also, if desired, these spacing rolls may act as contact members in connection with the sprocket or guide wheels such as 5, 8, with which the pump chain cooperates. This transversely spaced built up type of chain may of course be formed of any of the types or styles of chain link previously described and has the decided advantage that the chain is supported at a series of points so that intermediate sag and consequent bending of the connecting pivots and links is thus minimized.

This invention has been described in connection with a number of illustrative embodiments, forms, proportions, materials, parts, elements, arrangements and devices, to the details of which disclosure the invention is not of course to be limited, since what is claimed as new and what is desired to be secured by Letters Patent is set forth in the appended claims.

Having thus described my invention, what I claim is:

1. The chain pump comprising an upper supporting wheel formed with sprockets, a top casing arranged in co-operation with said supporting wheel, a continuous liquid carrying chain cooperating with said supporting wheel and casing and formed of intermeshing water carrying wire links and cooperating connecting pivots, each of said links having a connector member cooperating with and substantially enclosing two adjacent connecting pivots and having laterally projecting water carrying portions arranged on both sides of said connector member and comprising a series of longitudinal members and connected end loops projecting beyond said connector member and adjacent the end loops of the laterally aligned chain links, spacing and driving rolls arranged between said water carrying links on said connecting pivots to form transversely separated chain sections and an intermediate sprocket driving wheel engaging said driving rolls to operate said liquid carrying chain from a point below said upper supporting wheel.

2. The chain pump comprising an upper supporting wheel, a top casing arranged in cooperation with said supporting wheel, a continuous liquid carrying chain cooperating with said supporting wheel and casing and formed of intermeshing water carrying links and cooperating connecting pivots and spacing and driving rolls arranged between said water carrying links on said connecting pivots to form transversely separated chain sections.

3. The chain pump comprising an upper supporting wheel, a top casing arranged in cooperation with said supporting wheel, a continuous liquid carrying chain cooperating with said supporting wheel and casing and formed of intermeshing water carrying wire links and cooperating connecting pivots, each of said links having a connector member cooperating with and substantially enclosing two adjacent connecting pivots and having laterally projecting water carrying portions arranged on both sides of said connector member and comprising a series of integral longitudinal members and connected end loops projecting beyond said connector member and adjacent the end loops of the laterally aligned chain links.

4. The chain pump comprising an upper supporting wheel, a continuous liquid carrying chain cooperating with said supporting wheel and formed of intermeshing water carrying wire links and cooperating connecting pivots, each of said links having a connector member cooperating with and substantially enclosing two adjacent connecting pivots and having laterally projecting water carrying portions comprising a series of integral longitudinal members and connected end loops projecting beyond said connector member.

5. The pump chain comprising intermeshing bent wire links arranged side by side and cooperating connecting pivots, said links each being formed with a connector member havng bent ends adapted to enclose two of said connecting pivots and formed with integral longitudinal members arranged on both sides of and substantially parallel with said connector member and formed with connected end loop members projecting beyond said connector member to increase the liquid carrying capacity of the link.

6. The pump chain comprising intermeshing links arranged side by side and cooperating connecting pivots, said links each being formed with a connector member adapted to enclose two of said connecting pivots and formed with longitudinal members arranged on both sides of said connector member to increase the liquid carrying capacity of the link.

7. The pump chain comprising intermeshing bent wire links arranged side by side, said links each consisting of a single piece of square sectioned wire and being formed with a connector member having welded bent ends adapted to cooperate with two connecting pivots and formed with integral longitudinal members arranged on both sides of said connector member and formed with connected end loop members projecting beyond said connector member to increase the liquid carrying capacity of the link.

8. The pump chain comprising intermeshing bent wire links arranged side by side, said links each consisting of a single piece of wire and being formed with a connector member having welded bent ends adapted to cooperate with two connecting pivots and formed with integral longitudinal members and formed with connected end loop members projecting beyond said connector member to increase the liquid carrying capacity of the link.

9. The pump chain comprising intermeshing bent wire links arranged side by side, said links each consisting of a single piece of wire and being formed with a connector member having bent ends adapted to cooperate with two of said connecting pivots and formed with integral longitudinal members, and formed with connected end loop members.

In testimony whereof I have signed my name to this specification.

RAMON LONG.